United States Patent [19]

Mennicke et al.

[11] 4,414,296
[45] Nov. 8, 1983

[54] ELECTROCHEMICAL STORAGE CELL OR BATTERY

[75] Inventors: Stefan Mennicke, Leinen-Gau; Karl Reiss, Mühlhausen-Rettigheim; Kurt Liebermann, Mannheim, all of Fed. Rep. of Germany

[73] Assignee: Brown, Boveri & Cie AG, Mannheim, Fed. Rep. of Germany

[21] Appl. No.: 371,123

[22] Filed: Apr. 23, 1982

[30] Foreign Application Priority Data

Feb. 5, 1981 [DE] Fed. Rep. of Germany ....... 3117381

[51] Int. Cl.³ .......................................... H01M 10/39
[52] U.S. Cl. ...................................... 429/50; 429/104
[58] Field of Search .................................. 429/104, 50

[56] References Cited

U.S. PATENT DOCUMENTS

| | | | |
|---|---|---|---|
| 4,110,516 | 8/1978 | Breiter | 429/104 |
| 4,212,933 | 7/1980 | Markin et al. | 429/104 |
| 4,216,275 | 8/1980 | Hartmann et al. | 429/104 |
| 4,232,098 | 11/1980 | Park et al. | 429/104 |
| 4,234,668 | 11/1980 | Park et al. | 429/104 |

FOREIGN PATENT DOCUMENTS 2814905 11/1979 Fed. Rep. of Germany ...... 429/104

*Primary Examiner*—Donald L. Walton
*Attorney, Agent, or Firm*—Herbert L. Lerner; Laurence A. Greenberg

[57] ABSTRACT

Electrochemical storage cell based on alkali metal and chalcogen as reactants with an anode space and a cathode space separated by an alkali ion conducting solid electrolyte wall and bounded by a cell wall of light metal such as aluminum. A strongly adhering metal coating is applied to the area of the light metal wall in contact with one of the reactants. The metal coating chemically reacts to form a sulfide without materially affecting conductivity of the cell wall of light metal and without material increase in the internal resistance of the storage cell.

7 Claims, 1 Drawing Figure

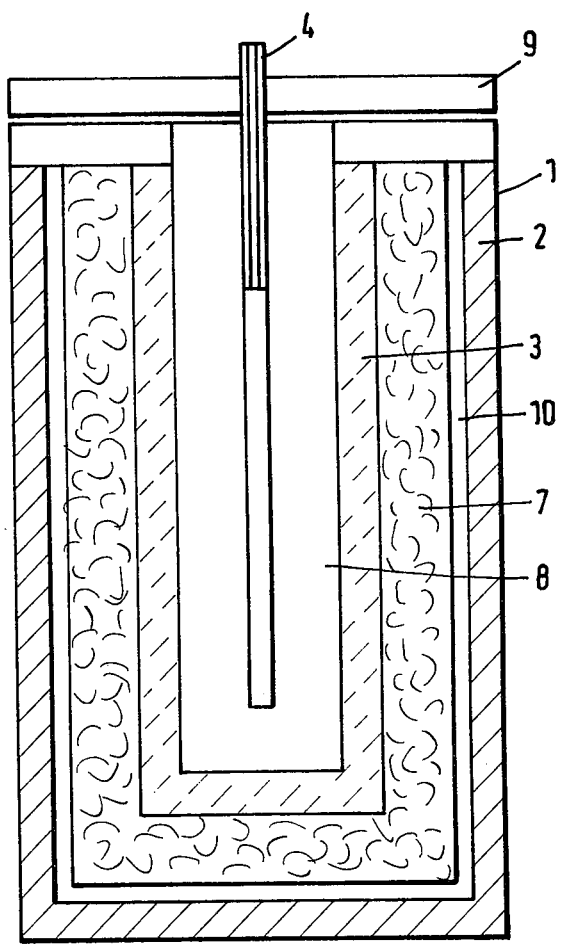

ELECTROCHEMICAL STORAGE CELL OR BATTERY

BACKGROUND OF THE INVENTION

1. Field of the Invention

The invention relates to an electrochemical storage cell or battery of the alkali-metal and chalcogen type with at least one anode space for receiving a first reactant, and a cathode space for receiving a second reactant, with the anode space and the cathode space separated from each other by an alkali ion-conducting solid electrolyte wall, and the cell bounded by a cell wall of metal.

2. Description of the Prior Art

Storage cells of the above-mentioned type offer a considerable simplification of the design through the use of the cell wall as current collector. A further advantage is obtained here through the use of light metal for the cell walls which gives the storage cells or batteries a high power density.

Aluminum is preferably used for fabricating the cell housing. However, a substantial disadvantage is that a non-conducting sulfide layer develops on the cell wall material, especially by the sulfur on the sodium polysulfide melt.

To overcome this difficulty, it has been proposed in German Published Non-Prosecuted Application No. 24 57 418 to have the cell wall preceded by a shielding electrode of corrosion-resistant material particularly graphite. It is known from U.S. Pat. No. 3,749,603 to protect the cell walls, which consist of light metal, of such storage cells against corrosion by means of a coating of $MoS_2$. Furthermore, an attempt was undertaken to coat the light metal cell walls with cobalt- or chromium sulfides.

While the above succeeded in improving the corrosion behavior for a short term, new disadvantages were added over a long term. Mentioned particularly is the disadvantageous increase of the internal resistance of the storage cell due to reaction of the light metal cell wall and the formation of a sulfide layer on the cell wall.

SUMMARY OF THE INVENTION

It is, therefore, an object of the invention to provide an electrochemical storage cell with a light-metal housing, the surface of which can be changed chemically, with little cost in material and time, such that a conducting layer is formed on the metal housing wall without material increase in internal resistance of the storage cell under operating conditions of the storage cell.

With the foregoing and other objects in view, there is provided in accordance with the invention, an electrochemical storage cell or battery based on alkali metal and chalcogen as reactants with at least one anode space for a first reactant and a cathode space for a second reactant, with the anode space and the cathode space separated from each other by an alkali-ion conducting solid electrolyte wall, and bounded by a cell wall of light metal, the combination therewith of a strongly adhering metal coating on at least the area of the light metal wall in contact with at least one of the two reactants, said metal coating formed of at least one chemical element which can be oxidized during operation of the cell to the oxidation state +4, and the four-valent ions of which have a radius of $0.7 \pm 0.2$ Å.

In accordance with the invention, there is provided a method for minimizing increase in internal resistance of an electrical storage cell or battery based on sodium and sulfur as reactants with an anode space for the sodium and a cathode space for the sulfur, with the anode space and the cathode space separated from each other by an alkali-ion conducting solid electrolyte wall, and bounded by a cell wall of light metal which latter is in contact with said sulfur reactant, which comprises applying to the light metal in at least the area in contact with said sulfur reactant, a metal coating formed from a metal selected from the group consisting of Ti, Zr, Hf, Ge, Sn, Pb, Cr, Mo, W, V, Nb, Ta, Mn, Fe, Co and Nk, said applied metal coating having a maximum thickness of 1 $\mu$m, and subjecting the cell to normal operating conditions causing the metal coating to chemically react with the sulfur reactant in contact therewith to form a sulfide without materially affecting the conductivity of said cell wall of light metal and without material increase in the internal resistance of the storage cell resulting from said metal coating.

Other features which are considered as characteristic for the invention are set forth in the appended claims.

Although the invention is illustrated and described herein as embodied in an electrochemical storage cell or battery, it is nevertheless not intended to be limited to the details shown, since various modification may be made therein without departing from the spirit of the invention and without the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates a storage cell in accordance with the invention having a housing of light metal (aluminum), an inner tubular solid electrolyte, sodium in the interior of the electrolyte tube, a current collector extending into the sodium, a cathode space between the solid electrolyte and the housing containing sulfur, and a metal layer on the housing in contact with the sulfur.

DETAILED DESCRIPTION OF THE INVENTION

In accordance with the invention in an electrochemical storage cell of the type mentioned at the outset, the light metal housing has, at least in the region which is in contact with at least one of the two reactants, a tightly adhering metal coating which is formed of at least one chemical element which can be oxidized under the operating conditions of the storage cell up to the oxidation stage +4, and the four-valent ions of which have a radius of $0.7 \pm 0.2$ Å.

A metal of the Group IV a, IV b or VI b of the periodic system is preferably used for the preparation of the metal coating. Metals of the Group V b as well as manganese, iron, cobalt and nickel can likewise be used.

In one embodiment of the invention, the metal forming the metal coating is admixed to the light metal as an alloy component which is used for fabricating the metal housing of the storage cell. In the areas of the metal housing which is in contact with one of the two reactants, the light metal is etched off so that an enrichment of the additional metal comes about in these areas. Aluminum is preferably used in the fabrication of the metal housing. The metal coating applied, preferably has a thickness which does not exceed 1 $\mu$m. The enrichment of the metal on the surface to be protected can be achieved by segregation.

Another procedure for obtaining the desired surface modification is ion implantation. Likewise, the plasma-aided CVD (Chemical Vapor Deposition) process can be used for coating the cell wall. The metal coating can also be achieved by means of the PVD (Physical Vapor Deposition) process. The invention will be explained in greater detail in the following.

As shown in the drawing, the storage cell 1 according to the invention, has a cup-shaped body 2 of light metal, a solid electrolyte 3 and a current collector 4. In the embodiment example described here, the cup-shaped body is made of aluminum. In the interior of the cup-shaped body 2, the cup-shaped solid electrolyte 3 is arranged. This is a tube of $\beta$ aluminum oxide closed on one side. The dimensions of the solid electrolyte 3 are chosen so that a minimum spacing of several mm is left between its outer boundary surfaces and the inner boundary surfaces of the cup-shaped body 2, so that thereby a continuous space 7 between the surfaces is formed. The interior of the solid electrolyte 3 serves as the anode space 8, in which an alkali metal, especially sodium, is disposed. The interior of the solid electrolyte 3 may additionally be filled with a capillary-active material, such as a metal felt or metal wool, which is not saturated with the alkali metal. The amount of the sodium filled into the solid electrolyte 3 is chosen so that the lower and lateral boundary surfaces of the solid electrolyte is wetted by the sodium during the entire discharge process of the storage cell. The current collector 4 protrudes into the interior of the solid electrolyte 3. This is a graphite rod which is brought through the cover plate 9 of the storage cell and protrudes from the latter by several mm. The space 7 between the metal housing 2 and the solid electrolyte 3 serves as the cathode space. The metal housing 2 acts as the cathodic current collector. The interior of the cathode space 7 is filled with a graphite felt which is saturated with sulfur. The inside surfaces of the cup-shaped body 2 in the area in contact with the catholyte substance are provided with a metal coating 10. This is a very thin layer, the maximum thickness of which is 1 $\mu$m. In the embodiment example described here, titanium was applied as the metal coating 10 to the inside surfaces of the cup-shaped metal housing 2. The titanium was applied in a gas discharge, the gas pressure being about 0.1 millibar. The coating took place during a timer period of one to two minutes. In the example described here, the cup-shaped body 2 is made of 99.5% aluminum. For coating, it was connected as the cathode to a potential of $-3.0$ to $-3.5$ kV in the d-c discharge. The titanium layer applied during the time mentioned above has a maximum thickness of 1 $\mu$m, as already mentioned. In the electrochemical storage cell according to this design, a conducting titanium sulfide layer or a titanium/aluminum mixed sulfide layer is formed under operating conditions. The formation of an aluminum sulfide layer is almost impossible in the storage cell described here. If, however, aluminum sulfide layers should be formed in certain areas due to the very thin titanium layer applied, the conductivity of the metal housing serving as the current collector is not materially affected. No increase of the internal resistance can be observed in the storage cell described here after many operating hours. The storage cell which is shown in the drawing and explained in the corresponding description can also be operated if the cathode space is arranged in the interior of the solid electrolyte and the anode space is arranged between the metal housing and the solid electrolyte.

Instead of a metal coating 10 of titanium, another metal can also be used for forming this layer, in particular, metals from Group IV a, IV b, VI b of the periodic system. For developing the metal coating, metals of the Group V b of the periodic system are also suitable. An effective metal coating can also be made with manganese, iron, chromium and nickel.

The invention is not limited to the embodiment examples described above, but covers all metallic coatings which can be applied to light metal and form, under the operating conditions of the storage cell, a conducting coherent metal-sulfide layer.

We claim:

1. Electrochemical storage cell or battery based on alkali metal and chalcogen as reactants with at least one anode space for a first reactant and a cathode space for a second reactant with the anode space and the cathode space separated from each other by an alkali-ion conducting solid electrolyte wall, and bounded by a cell wall of light metal, the combination therewith of a single strongly adhering metal coating on at least the area of the light metal wall in contact with at least one of the two reactants, said metal coating made of titanium and having a maximum thickness of 1 $\mu$m.

2. Storage cell according to claim 1, wherein the metal forming the metal coating is admixed to the light metal as a component of the alloy and is enriched in regions which are in contact with one of the true reactants, by etching-off the light metal.

3. Storage cell according to claim 1, wherein the formation of the metal coating is made by segregation under operating conditions of the storage cell.

4. Storage cell according to claim 1, wherein the metal coating is applied to the light metal by ion implantation.

5. Storage cell according to claim 1, wherein the metal coating is made by a plasma-aided CVD process.

6. Storage cell according to claim 1, wherein the metal coating is made by an ion-implanted PVD process.

7. Method for minimizing increase in internal resistance of an electrical storage cell or battery based on sodium and sulfur as reactants with an anode space for the sodium and a cathode space for the sulfur, with the anode space and the cathode space separated from each other by an alkali-ion conducting solid electrolyte wall, and bounded by a cell wall of light metal which latter is in contact with said sulfur reactant, which comprises applying to the light metal in at least the area in contact with said sulfur reactant, a single metal coating formed from titanium, said applied metal coating having a maximum thickness of 1 $\mu$m, and subjecting the cell to normal operating conditions causing the metal coating to chemically react with the sulfur reactant in contact therewith to form a sulfide without materially affecting the conductivity of said cell wall of light metal and without material increase in the internal resistance of the storage cell resulting from said metal coating.

* * * * *

UNITED STATES PATENT AND TRADEMARK OFFICE
CERTIFICATE OF CORRECTION

PATENT NO. : 4,414,296
DATED : November 8, 1983
INVENTOR(S) : STEFAN MENNICKE, KARL REISS and KURT LIEBERMANN It is certified that error appears in the above-identified patent and that said Letters Patent are hereby corrected as shown below:

In the heading to the printed specification, Item (30), line 14 of heading:

"Feb. 5, 1981 (DE) Fed. Rep. of Germany......3117381", should read:

--May 2, 1981 (DE) Fed. Rep. of Germany 3117381--.

Signed and Sealed this

Twenty-second Day of May 1984

[SEAL]

Attest:

GERALD J. MOSSINGHOFF

Attesting Officer

Commissioner of Patents and Trademarks